United States Patent [19]

Clarke

[11] 3,959,691

[45] May 25, 1976

[54] MOTOR PROTECTOR

[75] Inventor: David E. Clarke, Attleboto, Mass.

[73] Assignee: Texas Instruments Incorporated, Dallas, Tex.

[22] Filed: Apr. 16, 1973

[21] Appl. No.: 351,723

[52] U.S. Cl. .............................. 317/13 B; 337/389; 337/388

[51] Int. Cl.[2] ........................................... H02H 7/08

[58] Field of Search ........... 337/333, 334, 140, 390, 337/367, 382, 388, 389, 56, 91, 348, 358, 136, 139; 317/13 B, 13 C

[56] References Cited

UNITED STATES PATENTS

| | | | |
|---|---|---|---|
| 2,262,205 | 11/1941 | Schachtner | 337/56 |
| 2,510,021 | 5/1950 | Kaminky | 337/390 |
| 3,403,238 | 9/1968 | Buehler et al. | 337/140 UX |
| 3,555,479 | 1/1971 | Polkinghorn | 337/367 |
| 3,594,674 | 7/1971 | Willson | 337/140 X |
| 3,634,803 | 1/1972 | Willson | 337/140 X |

*Primary Examiner*—Gerald Goldberg
*Assistant Examiner*—Patrick R. Salce
*Attorney, Agent, or Firm*—John A. Haug; James P. McAndrews; Russell E. Baumann

[57] ABSTRACT

The disclosure relates to a manual reset motor protector device having an arm of a nickel-titanium metal alloy or the like supporting an electrical contact and having a spring arm supporting a second electrical contact, both of these arms being mounted on a device housing. A manual reset member is slidable on the housing for deforming the arm of the noted nickel-titanium metal alloy from an original configuration to a second configuration while the nickel-titanium alloy is below a predetermined transition temperature, whereby the device contacts are normally engaged to close a device circuit. When the device is mounted on a motor for protecting the motor against over-temperature conditions, electrical current is normally directed through the device circuit. However, when an over-temperature condition occurs in the device so that the initially deformed arm of the nickel-titanium alloy is heated above its transition temperature, the arm returns abruptly to its original configuration and moves away from the spring arm to open the device circuit. The reset member has portions arranged to engage the nickel-titanium alloy arm and the spring arm of the device separately as the reset member is moved to deform the nickel-titanium alloy arm. As a result, sliding movement of the reset member does not close the device contacts as the reset member is moved for deforming the nickel-titanium alloy arm. Accordingly, if the over-temperature condition in the device is continuing when the reset member is moved, the nickel-titanium alloy arm is not permanently deformed by movement of the reset member and returns to its original configuration on release of the reset member from its resetting position. The device circuit therefore remains open.

12 Claims, 6 Drawing Figures

MOTOR PROTECTOR

This invention relates to protective devices for motors and the like and more specifically, to over-current and/or over-heat devices for motors using a sensor which is a conductor formed from a nickel-titanium alloy, commonly known as Nitinol.

Protective circuits for motors and the like are necessary for the prevention of damage to the motor and to over-current therethrough and/or excessive heating up thereof. Many devices have been provided by the prior art to protect against over-current or over-heating. These devices, in general, have tended to be relatively expensive when reliable and relatively unreliable when inexpensive. Also, single protective devices have not been normally capable of protecting against over-current and/or over-heating with the single protective device.

In accordance with the present invention, there is provided a motor protector which is reliable, relatively inexpensive, protects against over-current and/or over-heating and, in addition, is manually resettable and trip-free. Briefly, the above is accomplished by providing a manual reset motor protector having a selected nickel-titanium alloy arm and a spring arm cantilevered from a housing to support mating contacts and having a manual reset member slidable on the housing for deforming the arm of the noted nickel-titanium alloy from an original configuration to a second configuration, the device being arranged so that said contacts are engaged to close a device circuit when the nickel-titanium alloy arm is in its second configuration. When over-temperature condition occurs, the initially deformed nickel-titanium arm returns abruptly to its original configuration and moves away from the spring arm contact to open the device circuit. The reset member is then manually depressed, when desired, for again deforming the nickel-titanium arm to reclose the device circuit. The reset member has portions arranged to contact the nickel-titanium alloy arm and the spring arm separately so that sliding movement of the reset member during deforming of the nickel-titanium arm does not close the contacts while the arms are engaged by the reset member. Thus, if the nickel-titanium material is still hot when the reset arm is moved, the nickel-titanium arm is not deformed by movement of the reset member and immediately returns to its original configuration when the reset member is released. Accordingly, the circuit is not reclosed during movement of the reset member and, on release of the reset member, the protective circuit remains open.

It is therefore an object of this invention to provide a protector for a motor or the like capable of protecting against over-current and/or over-heating.

It is a further object of the invention to provide a protector for a motor which is reliable and relatively inexpensive to manufacture or install.

It is a still further object of this invention to provide a motor protector which is mechanical in operation and manually resettable.

It is a yet further object of this invention to provide a motor protector which is inhibited from starting the motor during resetting.

The above objects and still further objects of the invention will immediately become apparent to those skilled in the art after consideration of the following preferred embodiments thereof, which are provided by way of example and not by way of limitation, wherein.

Figure 2:
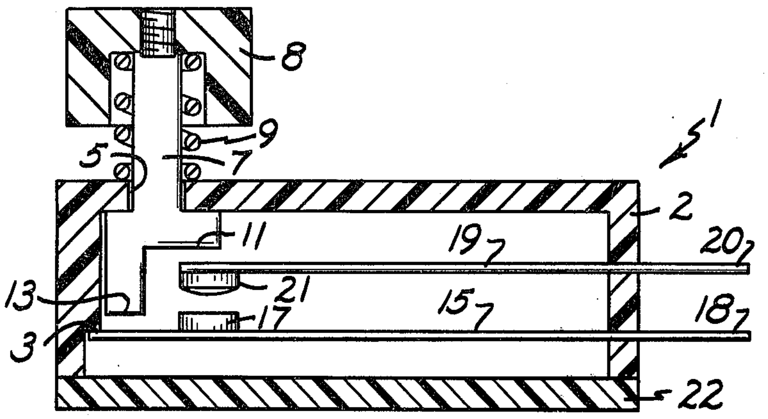
FIG. 2 is a view similar to FIG. 1 illustrating the device of FIG. 1 in the tripped position.
Figure 3:
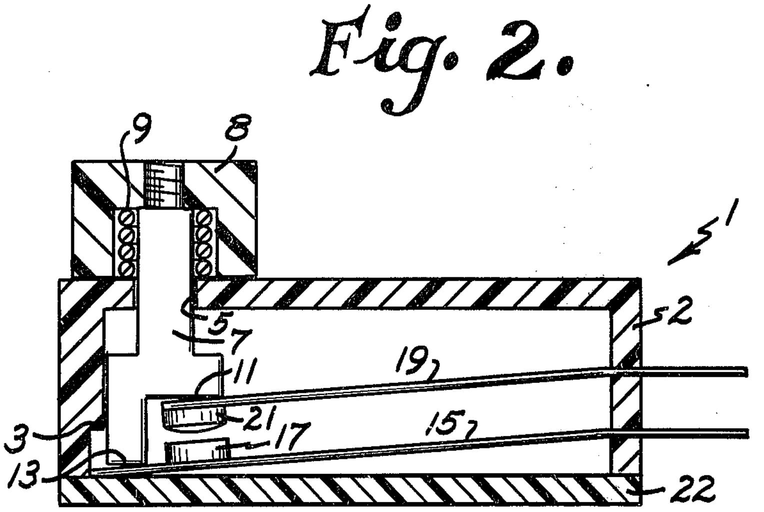
FIG. 3 is a view similar to FIG. 1 illustrating the device of FIG. 1 during manual resetting of the device.
Figure 1:
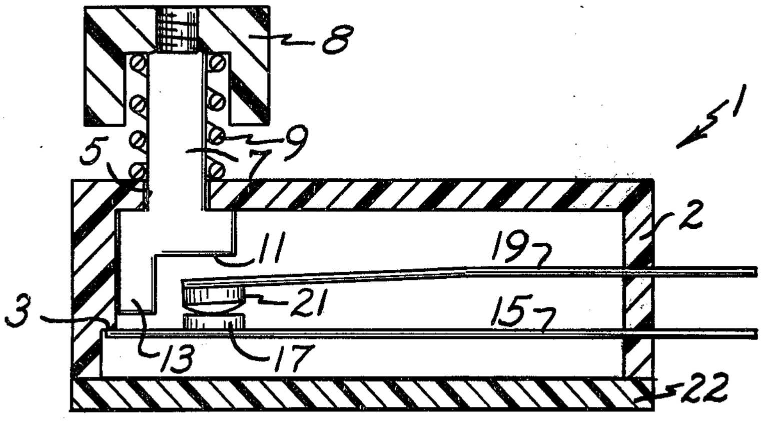
FIG. 1 is a section view along the principal axis of a first embodiment of a motor protector in accordance with the present invention, the protector device being illustrated in the running or closed circuit position.

Referring now to FIGS. 1–3, there is shown a first embodiment 1 of the motor protector device of this invention, the device being shown in its running or closed circuit position in FIG. 1. The protector includes a generally box-shaped housing 2 of electrically insulating material such as a phenolic resin having a shoulder 3 formed therein and having an aperture 5 through which a reset member or plunger 7, also of electrically insulating material, passes. The plunger 7 has a head 8 threadedly secured thereto and is normally biased away from the housing 2 by a spring 9 seated in an annular groove in the plunger head. The plunger includes a flat portion 11 and a downwardly depending finger 13. A spring arm 15 of any conventional, electrically conductive spring material such as phosphor bronze is cantilevered from the housing 2 and carries a contact 17 at its distal end, the arm 15 resting against the shoulder 3 in its normal position and having a terminal portion 18 extending outside the housing 2. A second arm 19 also extends through the housing 2 for mounting this arm in cantilever relation and for disposing a terminal portion 20 of the arm outside the housing. This arm 19 carries a second electrical contact 21 for mating engagement with the contact 17 to close a device circuit. A device base 22 is secured to the housing 2 in any conventional manner.

In accordance with this invention, the arm 19 is formed or a selected nickel-titanium alloy having a composition by weight of from about 54 to 56 percent nickel and the balance titanium. As this metal alloy is well known, the alloy will not be further described herein and it will be understood that this alloy displays a relatively low modulus of elasticity below a predetermined transition temperature and displays a relatively much higher modulus of elasticity at a temperature above the noted transition temperature. This metal alloy is also characterized in that the alloy is adapted to display remarkable memory characteristics. That is, when this nickel-titanium metal alloy is deformed to a selected extent from an original configuration to a second configuration while the metal alloy displays its relatively low modulus of elasticity below its noted transition temperature, the metal alloy is adapted to return abruptly to its original configuration and to display its relatively much higher modulus of elasticity when the alloy is heated above its transition temperature. In accordance with this invention, the metal alloy arm 19 is provided with an original configuration as as shown in FIG. 2 and is adapted to be deformed to a second configuration as shown in FIG. 3 by sliding movement of the reset plunger 7 on the device housing as illustrated in FIG. 3. In this regard, the plunger portions 11 and 13 are proportioned so that, when the plunger 7 is depressed against the housing 2 as shown in FIG. 3 for deforming the nickel-titanium alloy arm 19, the engagement of the plunger portions 11 and 13 with the arms 19 and 17 respectively hold the device contacts 17 and 21 separated as shown in FIG. 3 while deforming the alloy arm 19 to the desired extent.

In normal operation of the motor protector device 1, with the metal alloy arm 19 in its second or deformed configuration as illustrated in FIG. 1 and with the material of the arm 19 below its noted transition temperature, the bias of the spring arm 15 holds the contact 17 engaged with the contact 21 with selected pressure for closing the device circuit. Accordingly, current is adapted to be directed through the device circuit for energizing a motor (not shown) to be protected. If the arm 19 is then heated above its transition temperature as a result of over-current flow through the device circuit or as a result of over-heating of the motor and by heat-transfer from the motor to the device 1, the arm 19 returns abruptly to its original configuration as shown in FIG. 2 to open the device circuit and to deenergize the motor. When arm 19 has cooled sufficiently below its transition temperature so that the arm material again displays its relatively low modulus of elasticity, the plunger 7 is manually depressed against the bias of the spring 9 to the position shown in FIG. 3 where the plunger head rests against the housing 2, the arm 19 being deformed to the desired extent into the configuration shown in FIG. 3 by engagement of the plunger portion 11 with the arm 19. The spring arm 15 is depressed at the same time by the finger portion 13 of the plunger 7 so that the contacts 17 and 21 are not engaged while the plunger is depressed. When the plunger 7 is released, it assumes its position shown in FIG. 1 in response to bias of the spring 9 and the bias of the spring arm 15 engages the contact 17 with the contact 21 on the deformed nickel-titanium alloy arm 19, thereby resetting the motor protector in the position shown in FIG. 1. As will be understood, adjustment of the head 8 in threaded engagement with the plunger 7 serves to adjust the extent to which the arm 19 is deformed during manual depressing of the plunger.

If the reset member 7 is depressed as shown in FIG. 3 before the material of the arm 19 has cooled below its transition temperature, the material of the arm 19 displays its relatively high modulus of elasticity as the reset member is depressed. Accordingly, when the reset member 7 is released and assumes its upward position as shown in FIG. 2, the arm 19 springs back to the position shown in FIG. 2 without reclosing the device circuit.

Figure 4:
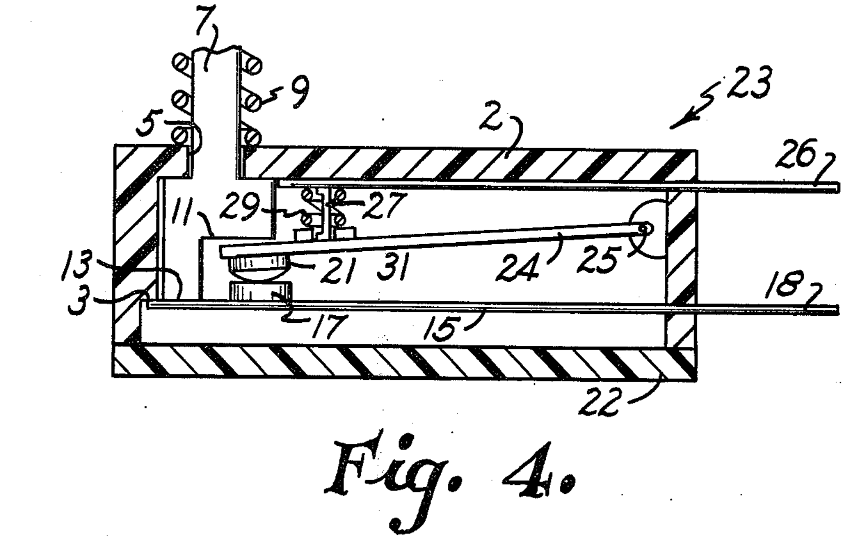
FIG. 4 is a partial section view along the principal axis of a second embodiment of the present invention.

Referring now to FIG. 4, there is shown a second embodiment 23 of the motor protector device of this invention, components of the device 23 corresponding to components of the device 1 previously described with reference to FIGS. 1–3 being identified with corresponding numerals in FIG. 4. This embodiment of the motor protector operates in a similar manner to the device 1 except that the nickel-titanium alloy arm 19 of FIGS. 1–3 is replaced by an arm 24 pivotably secured to the housing 2 at pivot 25, by a terminal 26 extending through the housing 2, and by a nickel-titanium alloy wire 27 secured in any conventional way between the pivoted arm 24 and the terminal 26. The wire 27 is maintained taut by a coil spring 29, the spring preferably being electrically insulated from the arm 24 by an annular insulating ring 31. As will be understood, the wire 27 has been previously deformed to the length shown in FIG. 4 from a relatively shorter original length while the wire 27 has displayed its relatively low modulus of elasticity below its transition temperature, whereby the device contacts 17 and 21 are engaged for closing the device circuit.

When the circuit of the device 23 is connected in a motor circuit so that current flows from the terminal 26 through the wire 27, the contacts 17 and 21 and the arm 15 to the terminal 18 and an over-temperature condition occurs so that the wire 27 is heated above its transition temperature, the wire abruptly shortens in length to pivot the arm 24 and to open the device circuit.

The device 23 is then reset by depressing plunger 7 to again deform and lengthen wire 27 under the concurrent downward bias of the spring 29 to complete the circuit between contacts 17 and 21. As will be understood, the plunger portion 13 engages the spring arm 15 during resetting of the device 23 so that the device contacts are not reengaged while the plunger is manually held in depressed position.

Figure 5:
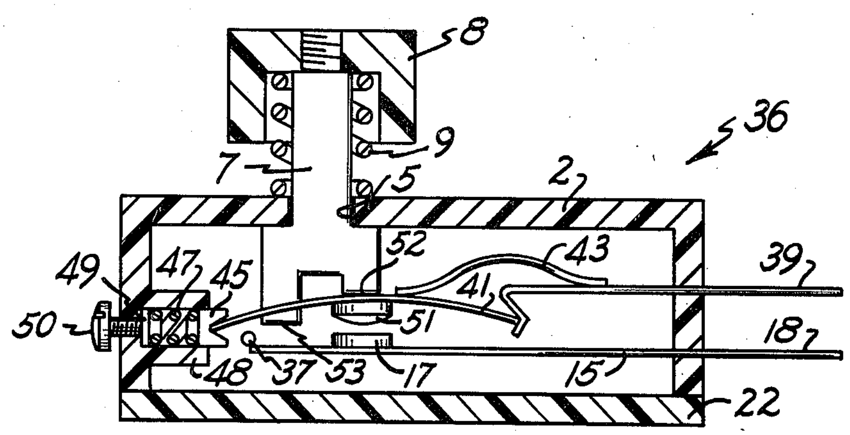
FIG. 5 is a section view along the principal axis of a third embodiment of the invention illustrating this embodiment of the invention in the open circuit or tripped condition.
Figure 6:
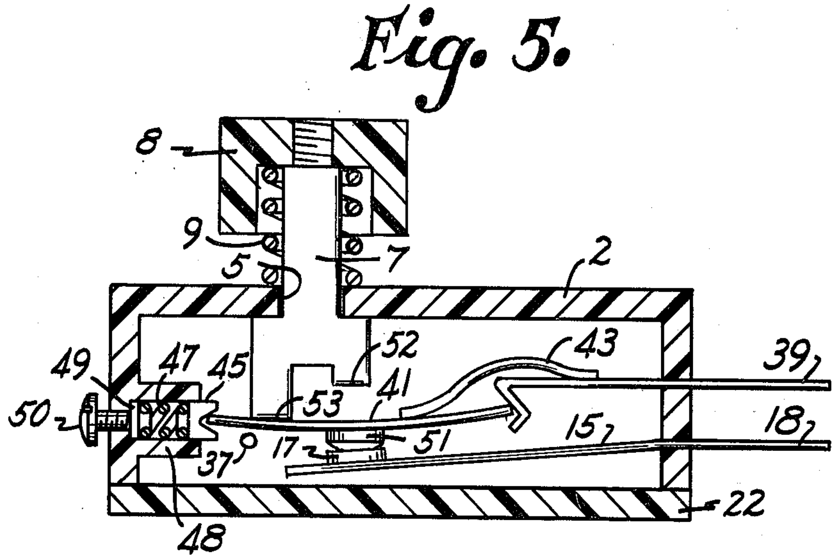
FIG. 6 is a view similar to FIG. 5 illustrating the device of FIG. 5 in the closed circuit position.

Referring now to FIGS. 5 and 6, there is shown a third embodiment 36 of the invention. In describing the device 36, corresponding reference numerals are used to identify components of the device corresponding to the components of the devices previously described with reference to FIGS. 1–3. In this embodiment 36 of the invention, the shoulder 3 is replaced by a stop 37 mounted on the housing 2; the plunger 7 is positioned at the center of the housing; and the arm 19 and contact 21 of FIGS. 1 to 3 are replaced by an assembly including a terminal 39, a dish-shaped member 41 of a nickel-titanium alloy material, at least one flexible wire or pigtail 43 electrically connected between the terminal 39 and member 41, a holding member 45 which is secured to a spring 47, an annular sleeve 48 secured to the housing 2 for permitting sliding of the holding member 45 therein, a plate 49 at the bottom of the sleeve, and a screw 50 threadedly engaged in the housing 2 and adjustable for adjusting bias of the spring 47 against the member 41. A contact 51 is disposed on the member 41 for mating contact with the contact element 17.

The nickel-titanium alloy member 41 has properties as described with reference to the arm 19 of FIGS. 1 to 3. In this embodiment, the member 41 is provided with the upwardly bowed shape as shown in FIG. 5 as its original configuration.

The device of FIG. 5 is operated by manually depressing the plunger 7 against the bias of the spring 9 whereupon the member 41 is bowed downward to an inverted dished configuration shown in FIG. 6 under the urging of the protrusion 52 on the plunger. The protrusion 53 on the plunger, which extends through a clearance opening in the member 41 as will be understood, urges the contact element 17 downwardly at the same time and forces the arm 15 downwardly below stop 37 holding the device circuit open while the plunger is depressed. The plunger is then released and is returned to its position as shown in FIG. 5. Since the arm 15 is normally biased toward the stop 37, contact element 17 and 51 will then engage to complete a device circuit. If the member 41 heats up to its transition temperature due to over-current through the member or due to thermal conductivity from a motor being protected, the member quickly returns to its original configuration as shown in FIG. 5. This disengages the contact elements 17 and 51 and removes power from the protected device. The system is manually reset by depression of plunger 7 as previously described. As will be understood, the screw 50 is adjustable for adjusting contact pressure with the device in closed circuit position. Preferably also, several pigtails 43 are connected between the terminal 39 and various parts of the member 41 to provide for symmetrical heating of the member in response to current flow in the device circuit.

It can be seen that there have been provided simple, inexpensive protective devices which are manually resettable but otherwise remain latched in the open position after tripping and which are responsive to over-current and/or over-heating of the protected device.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A control device comprising base means, a control means movable on said base means between first and second control positions, actuator means secured between said control means and said base means, said actuator means being formed of a selected metal alloy to be deformed from an original configuration when said control means is moved into one of said control positions while said alloy displays a relatively low modulus of elasticity below a transition temperature and to abruptly return to its original configuration and to display a relatively higher modulus of elasticity to move said control means into the other of said control positions when said alloy is heated above said transition temperature, reset means mounted for sliding manual movement on said base means to move said control means toward said one control position when said actuator means alloy is in its low modulus condition so that the extent of said sliding movement determines the extent of deformation of said actuator means, and means for limiting said manual movement of said reset means to limit deformation of said actuator means to a selected extent to deform said actuator means into a selected second configuration in response to manual movement of said reset means, whereby movement of said control means is effected between said control positions as said actuator means alloy is heated and cooled above and below said transition temperature.

2. A control device as set forth in claim 1 wherein said means limiting movement of said reset means on said base means is adjustable for permitting adjustment of the extent of said deformation of said actuator means which is accomplished in response to said manual movement of said reset means.

3. A motor protector device comprising housing means, first contact means mounted on said housing means, second contact means movable on said housing means between a position engaging said first contact means to close a circuit and a position spaced from said first contact means to open said circuit, actuator means secured between said second contact means and said housing means, said actuator means being formed of a selected metal alloy to be deformed from an original configuration when said second contact means is moved from one of said positions into the other of said positions while said alloy displays a relatively low modulus of elasticity below a transition temperature and to abruptly return to its original configuration and to display a relatively much higher modulus of elasticity to move said second contact means from said other position into said one position when said alloy is heated above said transition temperature, reset means mounted for sliding manual movement on said housing means to move said second contact means toward said other position when said actuator means alloy is in its low modulus condition so that the extent of said sliding movement determines the extent of deformation of said actuator means, and means for limiting said manual movement of said reset means to limit deformation of said actuator means to a selected extent to deform said actuator means into a selected second configuration in response to manual movement of said reset means, whereby movement of said contact means is effected between the engaging and the spaced positions as said actuator means alloy is heated and cooled above and below said transition temperature.

4. A motor protector device as set forth in claim 3 wherein said actuator means comprises a wire of a selected nickel-titanium alloy.

5. A motor protector device as set forth in claim 4 wherein said nickel-titanium alloy has a composition by weight of from about 54 to 56 percent nickel and the balance titanium.

6. A motor protector device as set forth in claim 5 wherein said nickel-titanium alloy wire is electrically connected in series with said first and second contact means.

7. A motor protector device comprising a housing, a leaf spring cantilever mounted on said housing to form a first device terminal, said leaf spring having a first contact means mounted thereon, an actuator element cantilever mounted on said housing to form a second device terminal, second contact means mounted on said actuator element, said actuator element being formed of a selected metal alloy to be deformed from an original configuration to move said second contact means into contact with said first contact means to a position closing a device circuit while said alloy displays a relatively low modulus of elasticity below a transition temperature and to abruptly return to its original configuration and to display a relatively much higher modulus of elasticity to move said second contact means away from said first contact means to a position opening said circuit when said alloy is heated above said transition temperature and a reset member mounted for sliding manual movement on said housing for engaging said actuator element to move said second contact means into contact with said first contact means when said actuator element alloy is in its low modulus condition so that the extent of said sliding movement determines the extent of deformation of said actuator element, and means for limiting said manual movement of said reset member to limit deformation of said actuator element to a selected extent to deform said actuator element into a selected second configuration to engage said second contact means with said first contact means to close said device circuit in response to manual movement of said reset member whereby movement of said second contact means between said circuit positions is effected as said actuator element alloy is heated and cooled above and below said transition temperature.

8. A motor protector device as set forth in claim 7 wherein said reset member has spaced portions arranged to separately engage said leaf spring and said actuator element during manual movement of said reset member, said reset member portions being spaced to move said leaf spring and actuator element with said first and second contacts spaced from each other during deformation of said actuator element to said second configuration.

9. A motor protector device comprising a housing, a leaf spring cantilever mounted on said housing to form a first device terminal, said leaf spring having first contact means mounted thereon, a second device terminal mounted on said housing, a contact arm pivotably mounted on said housing and carrying a second contact means, spring means biasing said contact arm toward a position engaging said first and second contact mean to close a device circuit, an actuator wire secured between said contact arm and second terminal, said actuator wire being formed of a selected metal alloy to be deformed from an original length to a second length as said contact arm is moved to engage said second contact means with said first contact means while said alloy dsplays a relatively low modulus of elasticity below a transition temperature and to abruptly return to its original length and to display a relatively higher modulus of elasticity to move said contact arm away from said first contact means to open said circuit when said alloy is heated above said transition temperature, and a reset member mounted on said housing for sliding manual movement for engaging said contact arm to move said contact arm and to selectively deform said actuator wire to said second length, and means limiting said manual movement of said reset member to limit deformation of said actuator wire in response to manual movement of said reset member.

10. A motor protector device as set forth in claim 9 wherein said reset member has spaced portions arranged to separately engage said leaf spring and said contact arm during manual movement of said reset member for maintaining said first and second contact means spaced from each other during said movement of said reset member.

11. A motor protector device comprising a housing, a leaf spring cantilever mounted on said housing to form a first device terminal, said leaf spring having first contact means mounted thereon, a second terminal mounted on said housing, a holding member spring mounted on said housing, an actuator element of dished configuration disposed between said second terminal and said holding member in electrical connection to said second terminal and having a second contact means mounted thereon, said actuator element being formed of a selected metal alloy to be deformed from said original dished configuration to move said second contact means into contact with said first contact means to a position closing a device circuit while said alloy displays a relatively low modulus of elasticity below a transition temperature and to abruptly return to its original dished configuration and to display a relatively higher modulus of elasticity to move said second contact means away from said first contact means to a position opening said circuit when said actuator element is heated above said transition temperature, a reset member mounted for sliding manual movement on said housing for engaging said actuator element to move said second contact means into contact with said first contact means when said actuator element alloy is in its low modulus condition and to invert the configuration of said actuator element to an extent determined by the extent of said sliding movement, and means limiting said manual movement of said reset member to limit deformation of said actuator element to a selected extent to deform said actuator element to a selected inverted configuration to engage said second contact means with said first contact means to close said device circuit in response to manual movement of said reset member whereby movement of said second contact means is effected between said circuit positions as said actuator element alloy is heated and cooled above and below said transition temperature.

12. A motor protector device as set forth in claim 11 wherein said reset member has spaced portions for separately engaging said leaf spring and said actuator element during said manual movement of said reset member for maintaining said first and second contact means spaced from each other during said movement of said reset member.

* * * * *